United States Patent
Lo

(10) Patent No.: US 10,871,834 B1
(45) Date of Patent: Dec. 22, 2020

(54) MOUSE WITH AIR LEVITATION SLIDING DEVICE

(71) Applicant: HUAN LAN INTERNATIONAL CORPORATION, Zhudong Township, Hsinchu County (TW)

(72) Inventor: Chien-Kuo Lo, Zhudong Township, Hsinchu County (TW)

( * ) Notice: Subject to any disclaimer, the term of this patent is extended or adjusted under 35 U.S.C. 154(b) by 0 days.

(21) Appl. No.: 16/433,513

(22) Filed: Jun. 6, 2019

(51) Int. Cl.
   *G06F 3/033* (2013.01)
   *G06F 3/0354* (2013.01)
   *G06F 3/039* (2013.01)

(52) U.S. Cl.
   CPC ........ *G06F 3/03543* (2013.01); *G06F 3/0395* (2013.01)

(58) Field of Classification Search
   CPC .......................... G06F 3/03543; G06F 3/0395
   USPC ......................................................... 345/63
   See application file for complete search history.

(56) References Cited

U.S. PATENT DOCUMENTS

2008/0111791 A1* 5/2008 Nikittin .................. G06F 3/016
                                                    345/163

* cited by examiner

*Primary Examiner* — Amare Mengistu
*Assistant Examiner* — Jennifer L Zubajlo
(74) *Attorney, Agent, or Firm* — Egbert Law Offices, PLLC

(57) ABSTRACT

A mouse with an air levitation sliding device is disclosed. The mouse body has a top surface, a bottom surface, an internal chamber and a signal line. The main feature is that the mouse is further provided with an air levitation sliding device, including an air supply source, an air supply pipeline and an air injection channel, the air injection channel is disposed on the bottom surface of the mouse body, and the air supply source is disposed outside the mouse body, and two ends of the air supply pipeline are respectively connected to the air supply source and the air injection channel. Thereby, the air pressure generated by the air supply source is transmitted to the air injection channel through the air supply pipeline to eject out from the bottom surface of the mouse body, so that the mouse the mouse can be in the air levitation sliding state.

17 Claims, 6 Drawing Sheets

MOUSE WITH AIR LEVITATION SLIDING DEVICE

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention relates generally to a mouse, and more particularly to an innovative mouse with an air levitation sliding device.

2. Description of Related Art Including Information Disclosed Under 37 CFR 1.97 and 37 CFR 1.98

With the development of science and technology, the use of computer devices has become a common phenomenon in work. With the update of computers, the mouse of its accessory device has also been evolved with the development of science and technology. The existing mouse includes the wired and wireless types, and the mouse is usually placed to the slide on the computer desktop or on the mouse pad.

During the working process of the mouse, the bottom surface will rub against the surface of a fixed plane object (such as the surface of the desktop or mouse pad), and the user's hand operating the mouse needs to use the wrist as a fulcrum to control the mouse movement, so in the process, the mouse movement is usually difficult to avoid the effects of friction, which reduces the sensitivity and accuracy of the mouse's displacement action. Moreover, long-term operation can cause the user's wrist joints to feel numbness and pain, and even more serious carpal tunnel syndrome.

Based on the above problems, there is current development of a wireless magnetic levitation mouse, which usually includes a pedestal and a magnetic levitation mouse, and uses the principle of magnetic levitation technology to levitate the mouse a few centimeters above the pedestal, thereby eliminating friction of the mouse during the process of use.

However, the conventional magnetic levitation mouse structure type has found that there are still some problems in practical use experience, for example, since the magnetic levitation mouse structure includes a pedestal and a magnetic levitation mouse, the industry must remanufacture the pedestal member other than the mouse, this will inevitably lead to a problem that the component is complicated and the manufacturing cost is greatly increased. Moreover, from the perspective of the user, the pedestal and the magnetic levitation mouse are matched, and both must be combined to perform the mouse levitation function, thereby causing limitations in the use of the mouse, if the mouse is placed on the general desktop or other mouse pad, the effect cannot be played, there are some inconveniences.

BRIEF SUMMARY OF THE INVENTION

The primary object of the present invention is to provide a mouse with an air levitation sliding device, and the technical problem to be solved is an innovation breakthrough in how to develop a new mouse structure type with more ideal practicability.

Based on said purpose, the present invention provides a mouse with an air levitation sliding device, comprising: a mouse body with a top surface, a bottom surface and an internal chamber, wherein the top surface is provided with plural control part, and the bottom surface is provided with a sensing part, and a signal line extends from one side of the mouse body, and an end part thereof has an electrical connection terminal; the air levitation sliding device comprises an air supply source, an air supply pipeline and one or more air injection channels, wherein the air injection channel is disposed on the bottom surface of the mouse body, and the air supply source is disposed outside the mouse body, and the air supply source generates the air pressure, so that the two opposite ends of the air pipeline are respectively connected to the air supply source and the air injection channel; thereby, when the air supply source generates the air pressure, the air pressure is transmitted to the air injection channel through the air pipeline to eject out from the bottom surface of the mouse body, thereby enabling the mouse in the air levitation sliding use status.

By using the innovative unique structural type and technical features, the present invention can provide a mouse with air levitation sliding use function to eliminate the friction during the use of the mouse, thereby improving the sensitivity and accuracy of the displacement action of the mouse, and reducing the pressure on the wrist of the user, with more comfortable advantages. The mouse with the function of the air levitation sliding function disclosed in the present invention has no problem to match with a specific base, and the mouse can achieve the functional state of the air levitation sliding regardless of the material plane, so the components are more simplified, more convenient to use and more practical and progressive.

Another object of the present invention is to further provide another technical feature of the activation sensing component provided by the top surface of the mouse body. The activation sensing component is electrically connected to the air supply source to sense whether the user's hand is placed on the top surface of the mouse body, and the control signal is transmitted to the air supply source, thereby achieving the advantages and practical progress of the automatic induction control to open and close the air supply source.

DETAILED DESCRIPTION OF THE INVENTION

Figure 1:
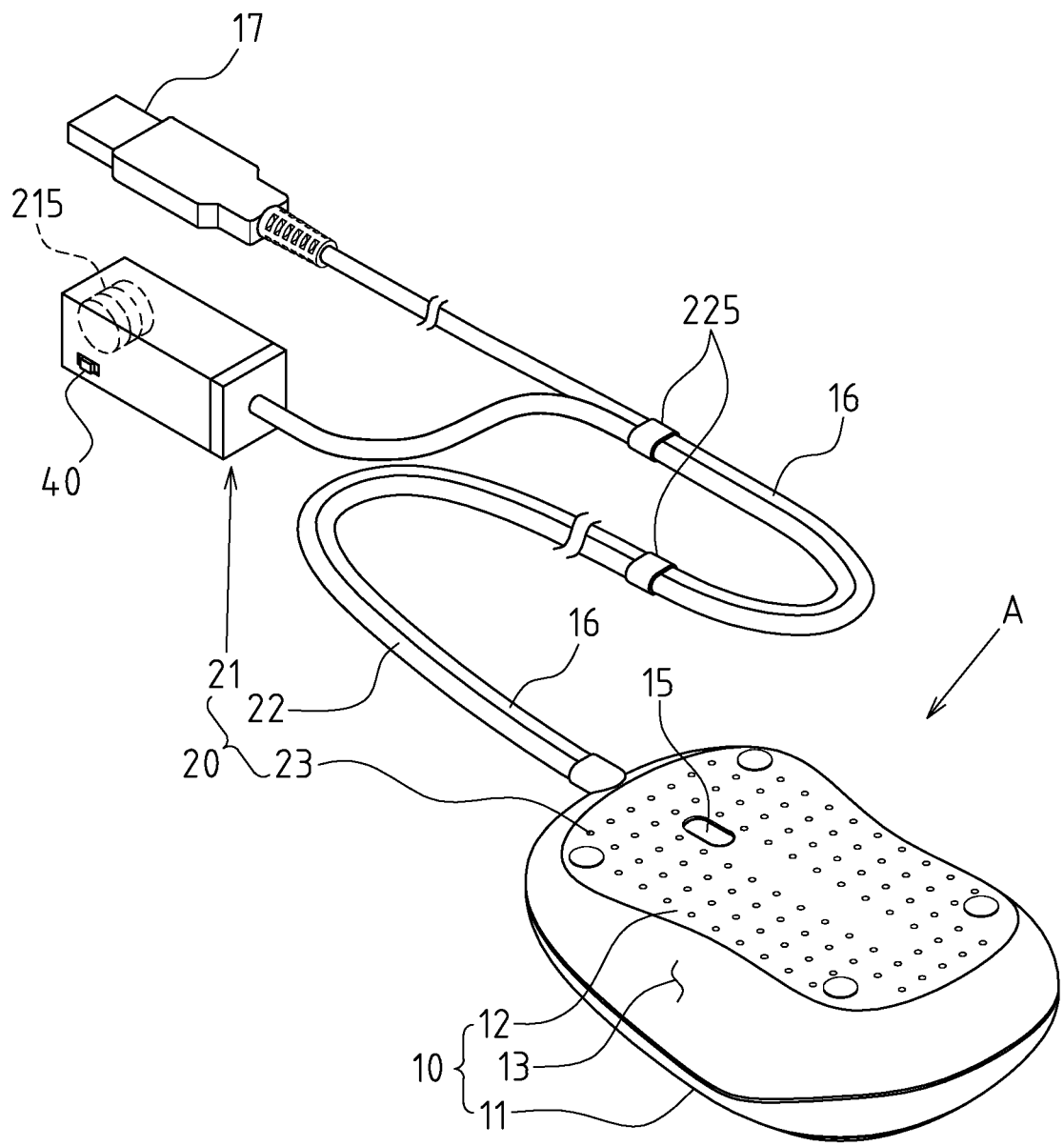
FIG. 1 is a three-dimensional diagram of a preferred embodiment of the mouse of the present invention.
Figure 2:
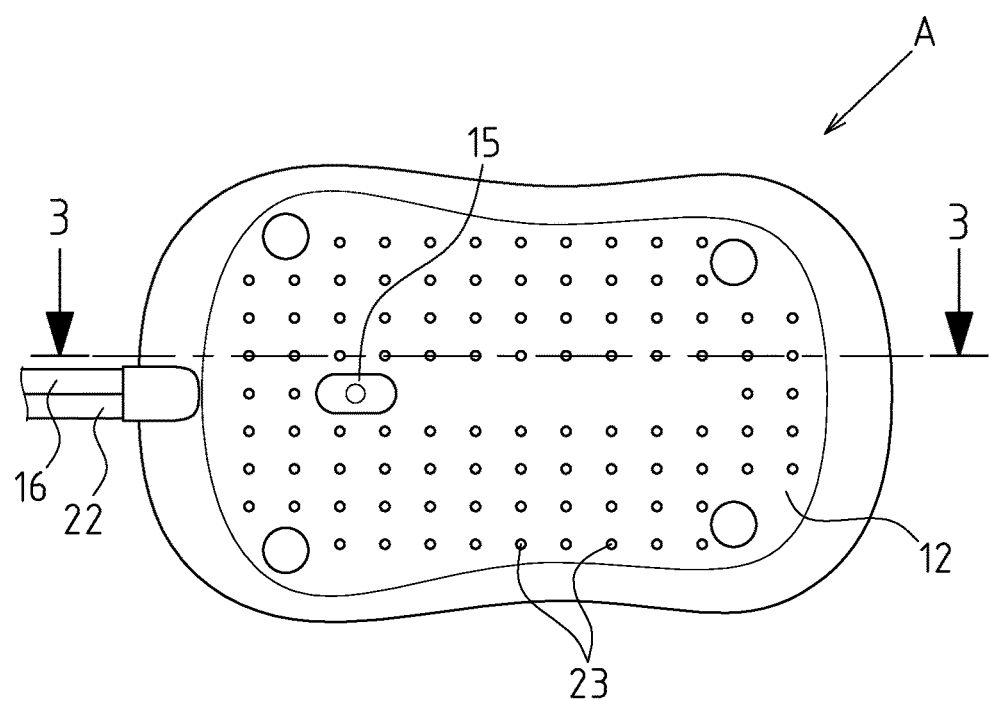
FIG. 2 is a bottom view of the mouse body of the present invention.

Referring to FIGS. 1 to 4 for the preferred embodiment of the mouse with an air levitation sliding device of the present invention, but these embodiments are for illustrative purposes only, and are not subject to this structure in patent applications.

The mouse A includes the following components: a mouse body 10 with a top surface 11, a bottom surface 12 and an internal chamber 13, wherein the top surface 11 is provided with a plural control part 14, and the bottom surface 12 is provided with a sensing part 15, and the side of the mouse body 10 is extended and provided with a signal line 16, the end of the signal line 16 is provided with an electrical connection terminal 17; an air levitation sliding device 20 includes an air supply source 21 (usually an air pressure pump), an air supply pipeline 22 and one or more air injection channels 23, wherein the air injection channel 23 is disposed on a bottom surface 12 of the mouse body 10, the air supply source 21 is disposed outside the mouse body 10, the air supply source 21 is used to generate an air pressure, so that the two opposite ends of the air pipeline 22 are respectively connected to the air supply source 21 and the air injection channel 23; thereby, when the air supply source 21 generates the air pressure, the air pressure is transmitted to the air injection channel through the air pipeline 22 to eject out from the bottom surface 12 of the mouse body 10, thereby enabling the mouse A in the air levitation sliding use status.

As shown in FIG. 1, in this embodiment, the air supply source 21 of the air levitation sliding device 20 is provided with a switch 40 for the user to manually control the opening and closing state of the air supply source 21.

Figure 3:
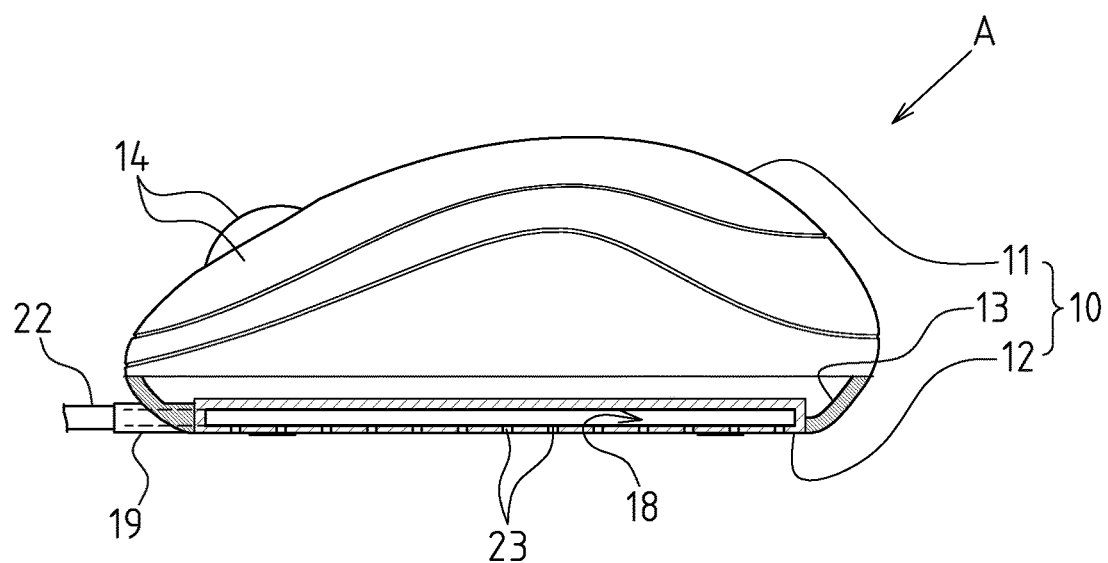
FIG. 3 is a 3-3 sectional view of FIG. 2.

As shown in FIG. 3, in this embodiment, the bottom surface 12 of the mouse body 10 is provided with the plural air injection channels 23 spaced apart, and an air collection chamber 18 is disposed above the bottom surface 12 of the mouse body 10, so that the plural air injection channels 23 are connected with the air collection chamber 18, and an air inlet interface 19 is provided on one side of the air collection chamber 18 to connect one end of the air supply pipeline 22 to the air inlet interface 19.

Figure 4:
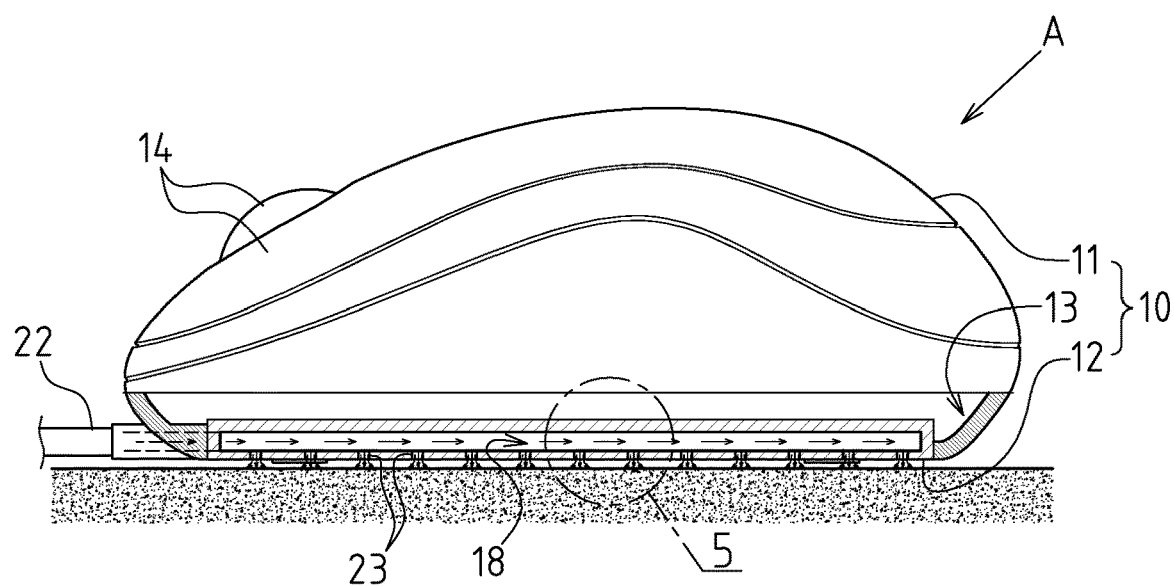
FIG. 4 is a schematic diagram of the use state of the preferred embodiment of the mouse of the present invention.
Figure 5:
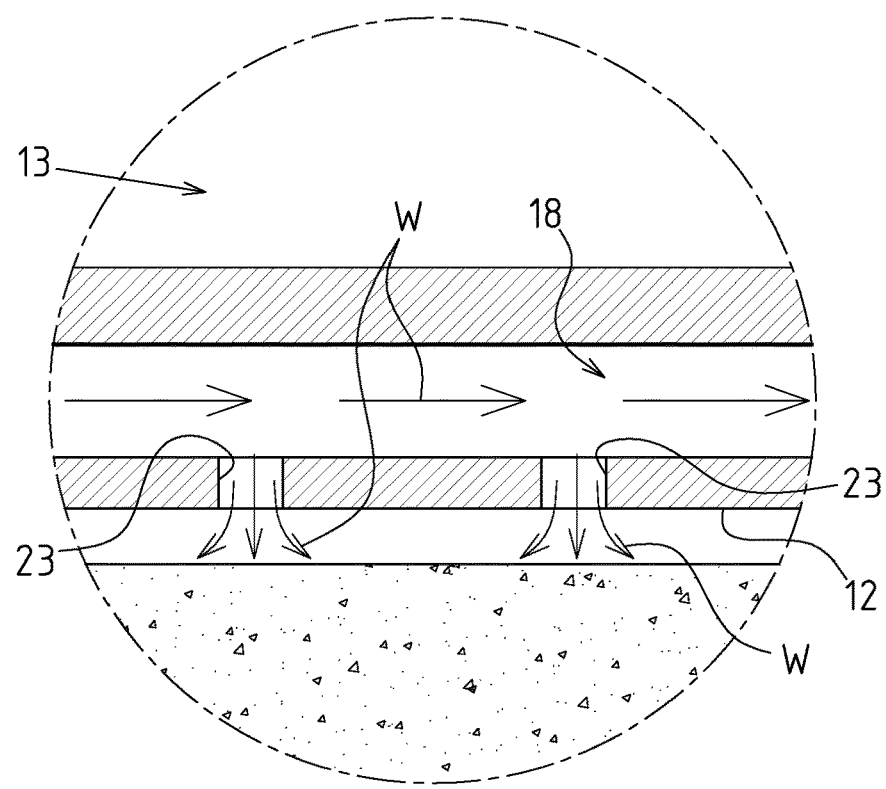
FIG. 5 is a diagram of partial enlargement of FIG. 4.

With said structural composition and technical features, the mouse with the air levitation sliding device disclosed in the present invention has the preferred embodiment as shown in FIGS. 4 and 5. When the user wants to operate the mouse A, first open the switch 40 disposed in the air supply source 21 of the air levitation sliding device 20 (as shown in FIG. 1), so that the air supply source 21 generates the air pressure W, the air pressure W is transmitted to the air injection channel 23 through the air supply pipeline 22, and then eject out from the bottom surface 12 of the mouse body 10 (as shown in FIG. 5) is ejected, thereby enabling the mouse A in the air levitation sliding use status. This state causes a levitation gap between the bottom surface 12 of the mouse body 10 and the desktop or the mouse pad, which can eliminate the friction of the mouse in the past use process, and can improve the sensitivity and accuracy of the mouse using the displacement action, and effectively reduce the pressure on the wrist of the user, thereby avoiding soreness and making the user more comfortable; in addition, the mouse with the function of air levitation sliding use is not matched with a specific pedestal in the use, and the mouse A can achieve air-floating sliding regardless of the material plan, so the components are more simplified and can reduce the manufacturing cost of the industry, and it is more convenient and easy to use.

Figure 6:
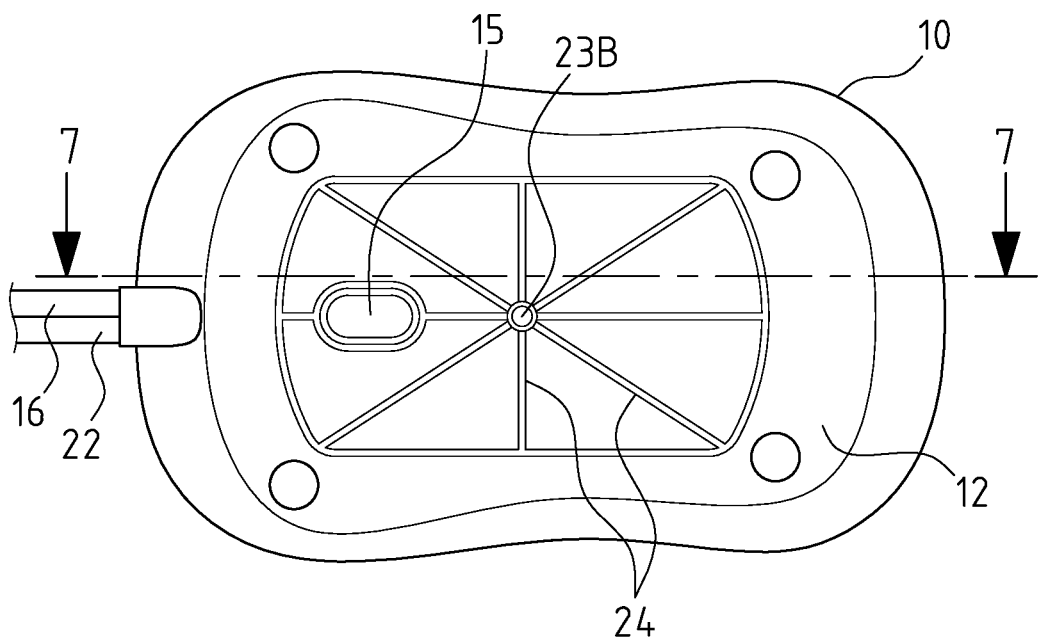
FIG. 6 is a bottom view of a mouse body of another preferred embodiment of the present invention.
Figure 7:
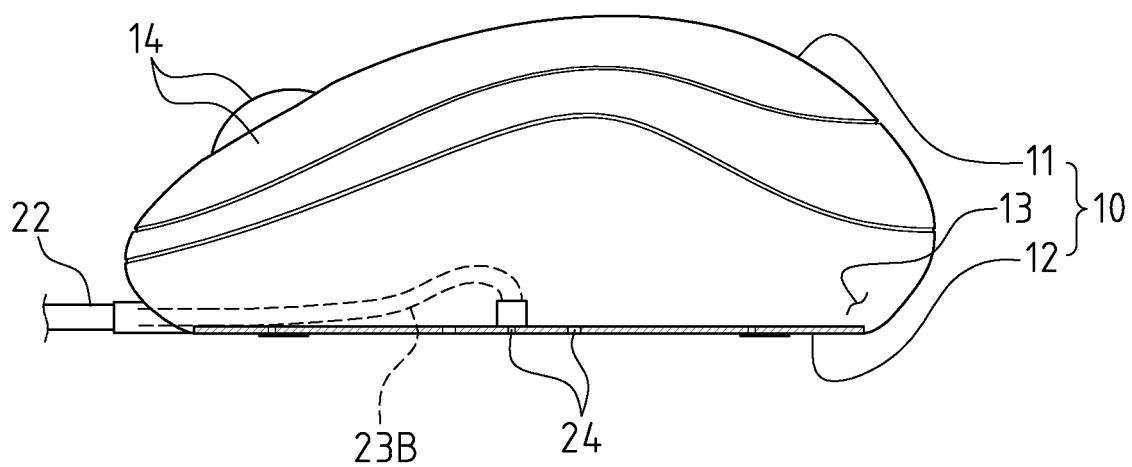
FIG. 7 is a 7-7 sectional view of FIG. 6.

As shown in FIGS. 6 and 7, in this embodiment, the bottom surface 12 of the mouse body 10 is provided with an air injection channel 23B, so that one end of the air supply pipeline 22 is extended into the internal chamber 13 of the mouse body 10 and connected with the air injection channel 23B, and the bottom surface 12 of the mouse body 10 is recessed and provided with at least one diffusion groove 24, and at least one diffusion groove 24 is connected to the air injection channel 23B to diffuse the air pressure; the specific shape of the diffusion groove 24 described in this embodiment can be a farmland shape or a rice shape with the area diffusion effect.

As shown in FIG. 1, in this embodiment, the air supply pipeline 22 is extended along the signal line 16; and the air supply pipeline 22 and the signal line 16 are merged into a single line or each of the two separate lines can be implemented in any type; this part is as shown in FIG. 1, and the air supply pipeline 22 and the signal line 16 are merged into a single line by a bundle kit 225 in one embodiment (not limited to a single or a plurality).

Wherein, the power supply type of the air supply source 21 is one of the following types: the first is the power input by the electrical connection terminal 17; the second is the power supplied by self-contained battery of the air supply source 21; this part is the air supply source 21 as shown in FIG. 1, the power is supplied by the self-contained battery 215.

Figure 8:
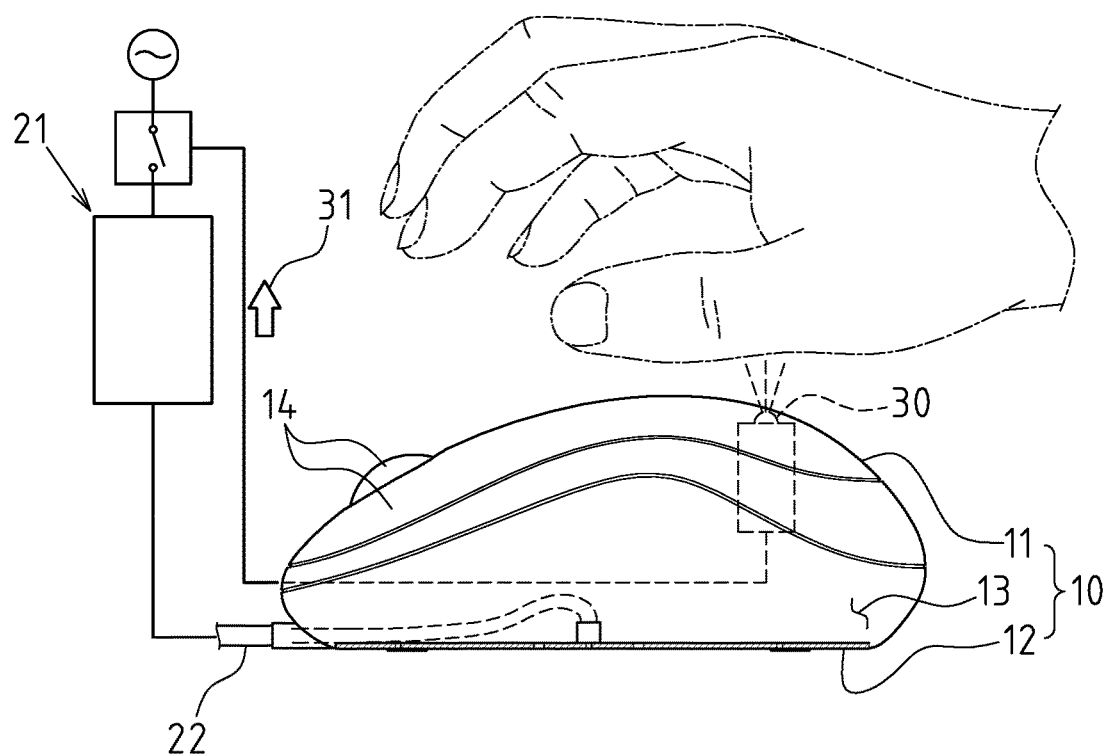
FIG. 8 is an embodiment diagram of the mouse body top surface of the present invention provided with the plural magnetic bodies.

As shown in FIG. 8, in this embodiment, the top surface 11 of the mouse body 10 is further provided with a start sensing part 30, and the start sensing part 30 is electrically connected with the air supply source 21 for sensing whether the user's hand is placed on top surface 11 of the mouse body 10, and a control signal 31 is transmitted to the air supply source 21, thereby automatically sensing and controlling the opening and closing state of the air supply source 21.

Figure 9:
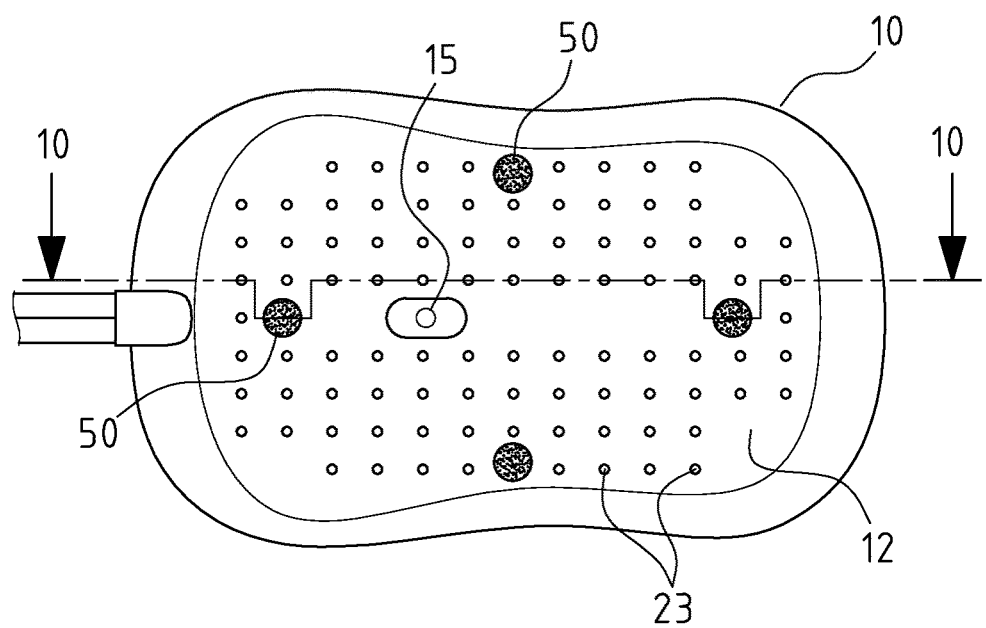
FIG. 9 is an embodiment diagram of the mouse body bottom surface of the present invention provided with the plural magnetic bodies.
Figure 10:
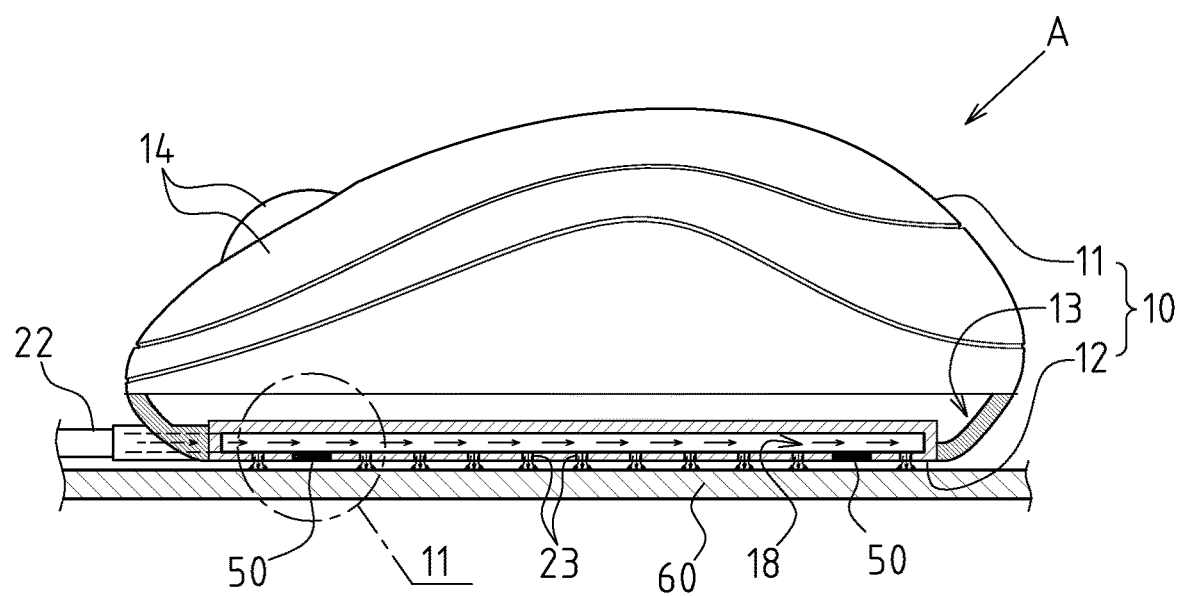
FIG. 10 is a 10-10 sectional view of FIG. 9 and its function schematic diagram.
Figure 11:
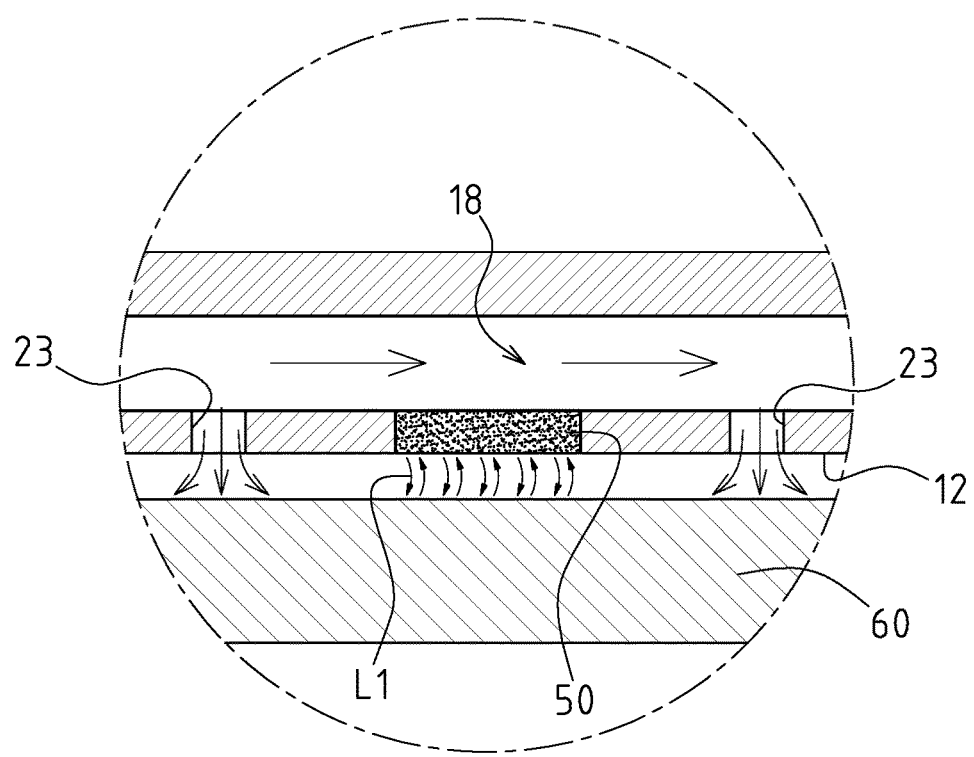
FIG. 11 is a diagram of partial enlargement of FIG. 10.

As shown in FIG. 9-FIG. 11, in this embodiment, the bottom surface 12 of the mouse body 10 is further provided with a magnetic body 50 spaced apart, and the mouse A is placed on a magnetic pad 60 as shown in FIG. 10 (such as a magnetic pad, an iron plate or a stainless steel plate, etc.), a magnetic attraction force is generated between the plural magnetic body 50 disposed on the bottom surface 12 of the mouse body 10 and the magnetic pad 60 (shown as the arrow L1 in FIG. 11), and the magnetic attraction force is smaller than the air levitation pressure of the mouse A in an air levitation sliding use state; thereby, when the mouse A is not displaced by force, the mouse A is restrained by the magnetic attraction force, avoiding its arbitrary drift.

I claim:

1. A mouse apparatus comprising:
   a mouse body having a top surface and a bottom surface and an internal chamber, the top surface having a plurality of control parts thereon, the bottom surface having a sensing part, said mouse body having side with a signal line, the signal line having an electrical connection terminal at an end thereof; and an air levitation sliding device having an air supply source and an air supply pipeline and at least one air injection channel, wherein the at least one air injection channel is disposed on the bottom surface of said mouse body, the air supply source being disposed away from said mouse body, the air supply source adapted to generate a gas pressure, one end of the air supply pipeline being connected to the air supply source, an opposite end of the air supply pipeline being connected to the at least one air injection channel, the at least one air injection channel opening to the bottom surface of said mouse body such that the gas pressure passing from the air supply pipeline into the at least one air injection channel flows downwardly below the bottom surface of said mouse body so as to levitate said mouse body.

2. The mouse apparatus of claim 1, wherein the at least one air injection channel comprises a plurality of air injection channels in spaced relation to each other at the bottom surface of said mouse body, the mouse apparatus further comprising:

an air collection chamber disposed above the bottom surface of said mouse body, the plurality of air injection channels being connected to said air collection chamber, said air collection chamber having an air inlet interface on one side thereof, one end of the air supply pipeline being connected to the air inlet interface.

3. The mouse assembly of claim 2, wherein the air supply pipeline extends along the signal line.

4. The mouse assembly of claim 3, wherein the air supply pipeline and the signal line are merged as a single line.

5. The mouse assembly of claim 2, the air supply source has a power supply which is a power inlet of the electrical connection terminal.

6. The mouse assembly of claim 2, wherein the air supply source has a power supply which is a self-contained battery of the air supply source.

7. The mouse assembly of claim 2, wherein the top surface of said mouse body has a start sensing part, the start sensing part being electrically connected to the air supply source and adapted to sense when a hand of a user is placed on the top surface of said mouse body, the start sensing part transmitting a control signal to the air supply source so as to automatically active or deactive the air supply source.

8. The mouse assembly of claim 2, wherein the air supply source has a switch adapted to allow a user to move the switch to activate or deactivate the air supply source.

9. The mouse assembly of claim 2, wherein the bottom surface of said mouse body has a plurality of spaced-apart magnetic bodies, the mouse apparatus further comprising:

a magnetic pad upon which said mouse body is placed, a magnetic attraction between the plurality of spaced-apart magnetic bodies and said magnetic pad being less than an air levitation pressure created by the gas pressure ejected from the at least one air injection channel.

10. The mouse apparatus of claim 1, wherein the opposite end of the air supply pipeline extends into the internal chamber of said mouse body, the bottom surface of said mouse body being recessed and having at least one diffusion groove, the at least one diffusion groove being connected to the at least one air injection channel so as to diffuse the gas pressure.

11. The mouse assembly of claim 1, wherein the air supply pipeline extends along the signal line.

12. The mouse assembly of claim 11, wherein the air supply pipeline and the signal line are merged as a single line.

13. The mouse assembly of claim 1, the air supply source has a power supply which is a power inlet of the electrical connection terminal.

14. The mouse assembly of claim 1, wherein the air supply source has a power supply which is a self-contained battery of the air supply source.

15. The mouse assembly of claim 1, wherein the top surface of said mouse body has a start sensing part, the start sensing part being electrically connected to the air supply source and adapted to sense when a hand of a user is placed on the top surface of said mouse body, the start sensing part transmitting a control signal to the air supply source so as to automatically active or deactive the air supply source.

16. The mouse assembly of claim 1, wherein the air supply source has a switch adapted to allow a user to move the switch to activate or deactivate the air supply source.

17. The mouse assembly of claim 1, wherein the bottom surface of said mouse body has a plurality of spaced-apart magnetic bodies, the mouse apparatus further comprising:

a magnetic pad upon which said mouse body is placed, a magnetic attraction between the plurality of spaced-apart magnetic bodies and said magnetic pad being less than an air levitation pressure created by the gas pressure ejected from the at least one air injection channel.

* * * * *